US005658104A

United States Patent [19]
Wong

[11] Patent Number: 5,658,104
[45] Date of Patent: Aug. 19, 1997

[54] METHOD AND SYSTEM FOR THE MANUFACTURE OF CO$_2$ POWERED DRAGSTER

[76] Inventor: Richard Wong, P.O. Box 1567, Hollywood, Fla. 33022

[21] Appl. No.: 595,645

[22] Filed: Feb. 2, 1996

[51] Int. Cl.$^6$ .................. B23Q 16/02; B23C 3/10
[52] U.S. Cl. .................. 409/131; 29/56.5; 269/57; 409/221; 409/224
[58] Field of Search .................. 29/27 R, 27 C, 29/55, 50, 54, 56.5, 33 R, 33 J; 409/219, 221, 222, 223, 224, 225, 227, 220, 131; 269/71, 63, 57, 136–138, 208; 144/135.2

[56] References Cited

U.S. PATENT DOCUMENTS

| | | | |
|---|---|---|---|
| 3,593,984 | 7/1971 | Carman et al. | 409/221 |
| 4,305,439 | 12/1981 | Skinner | 409/220 |
| 4,921,378 | 5/1990 | Kytölä | 269/57 X |
| 5,207,542 | 5/1993 | Baldwin | 409/221 X |
| 5,212,857 | 5/1993 | McMurtry | 29/38 C |

FOREIGN PATENT DOCUMENTS

| | | | |
|---|---|---|---|
| 2504662 | 2/1975 | Germany | 409/221 |
| 244075 | 10/1969 | U.S.S.R. | 409/221 |

Primary Examiner—William H. Briggs
Attorney, Agent, or Firm—Malloy & Malloy, P.A.

[57] ABSTRACT

A system for the manufacture of a CO$_2$ powered dragster with a low-cost three axis machine tool, the system including an expansion base to be fixedly secured to a support surface of the machine tool, and an indexing fixture to be adjustably secured to the expansion base. The indexing fixture has a generally elongate indexing plate which slides within the expansion base and is secured in one of at least two linear indexing positions, thereby positioning a portion of a material block from which a chassis of the dragster is made within a range of linear motion of the spindle, while a remaining portion of the material block is maintained aligned for subsequent positioning with the range of linear motion of the spindle, a rear end housing secured to a rear end of the indexing plate, and a front end housing secured a front end of the indexing plate. Extending through the rear end housing is a rear indexing shaft which clampingly secures the material block between itself and a spur block rotatably disposed at the front end housing. The rear indexing shaft, and accordingly the material block secured thereto, is structured to be selectively aligned, in one of at least two rotational indexing positions, thereby selectively positioning a corresponding surface of the material block within a range of vertical motion of the spindle while an additional surface of the material block is maintained aligned for subsequent positioning within the range of vertical motion of the spindle.

34 Claims, 5 Drawing Sheets

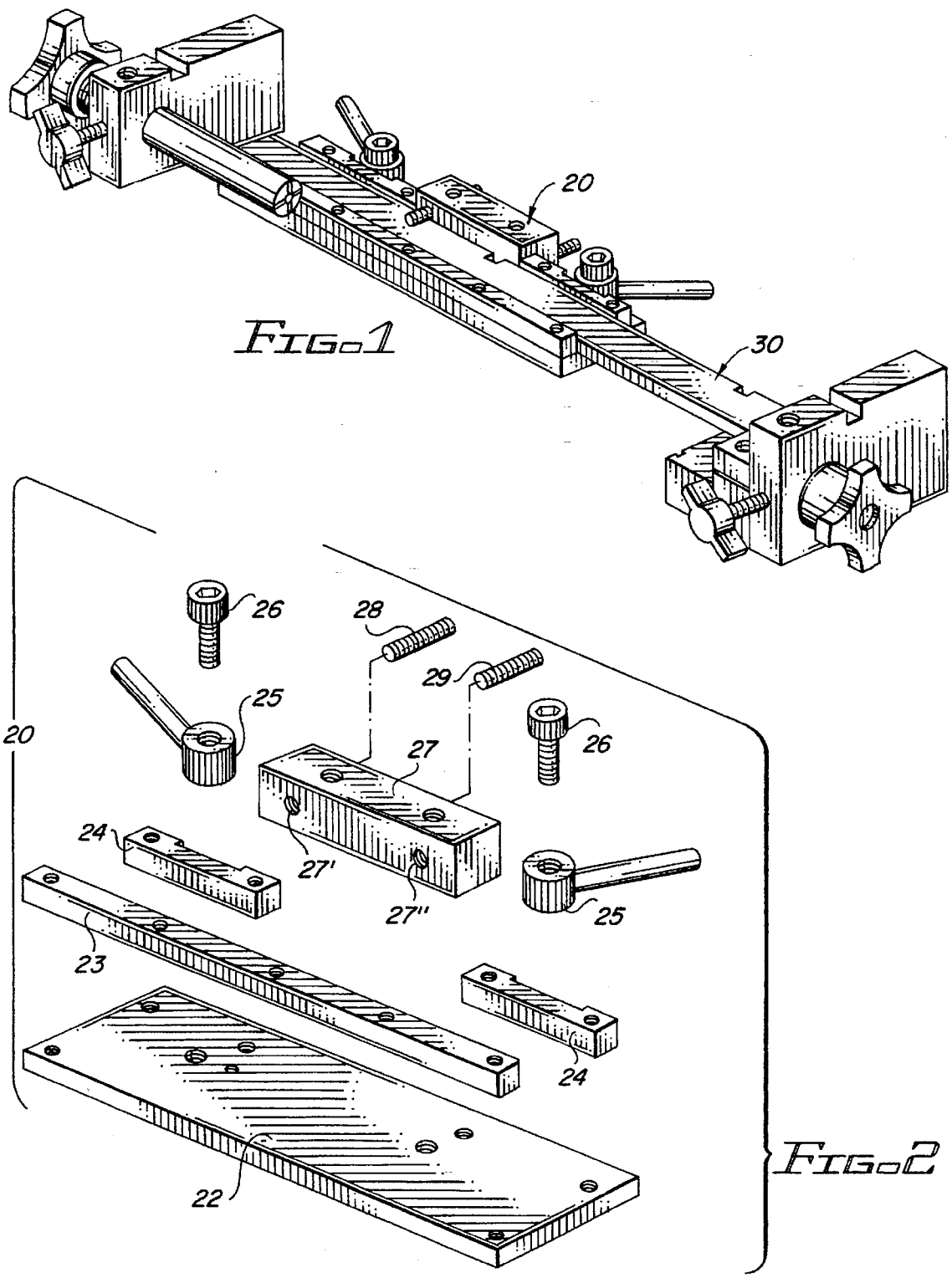

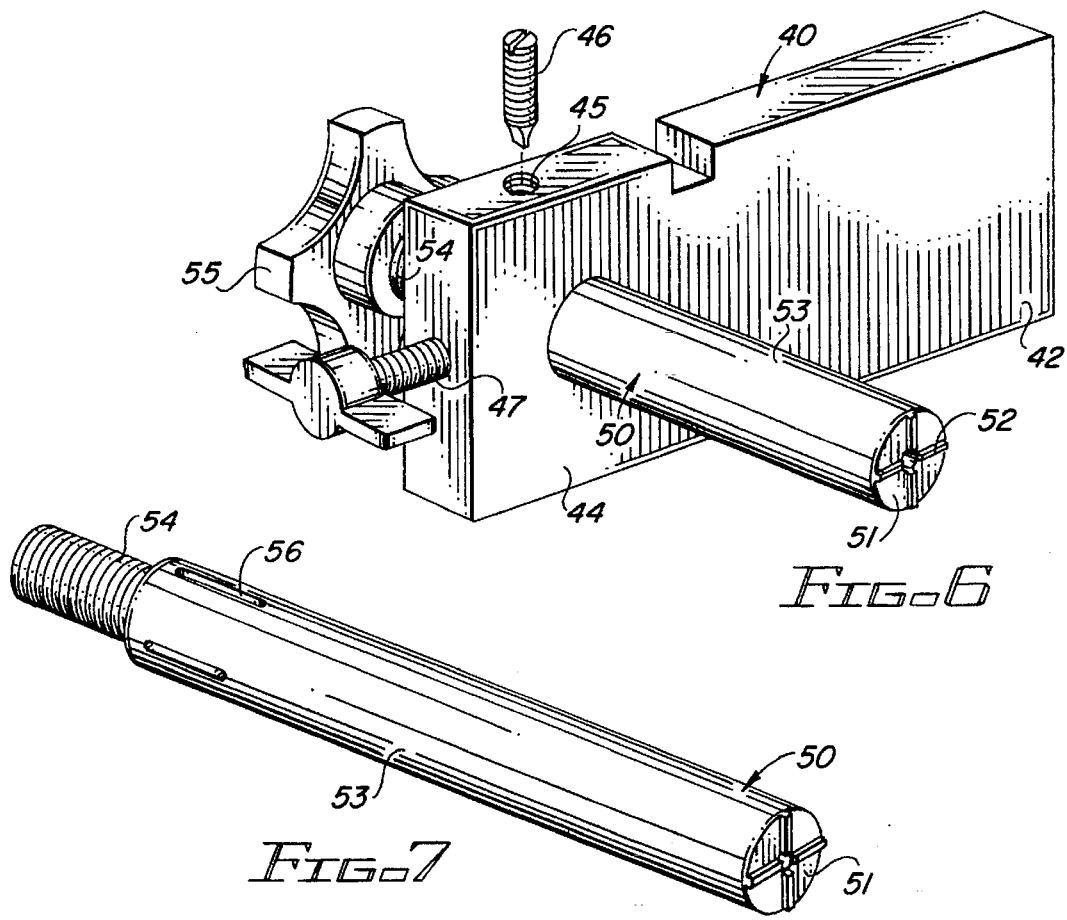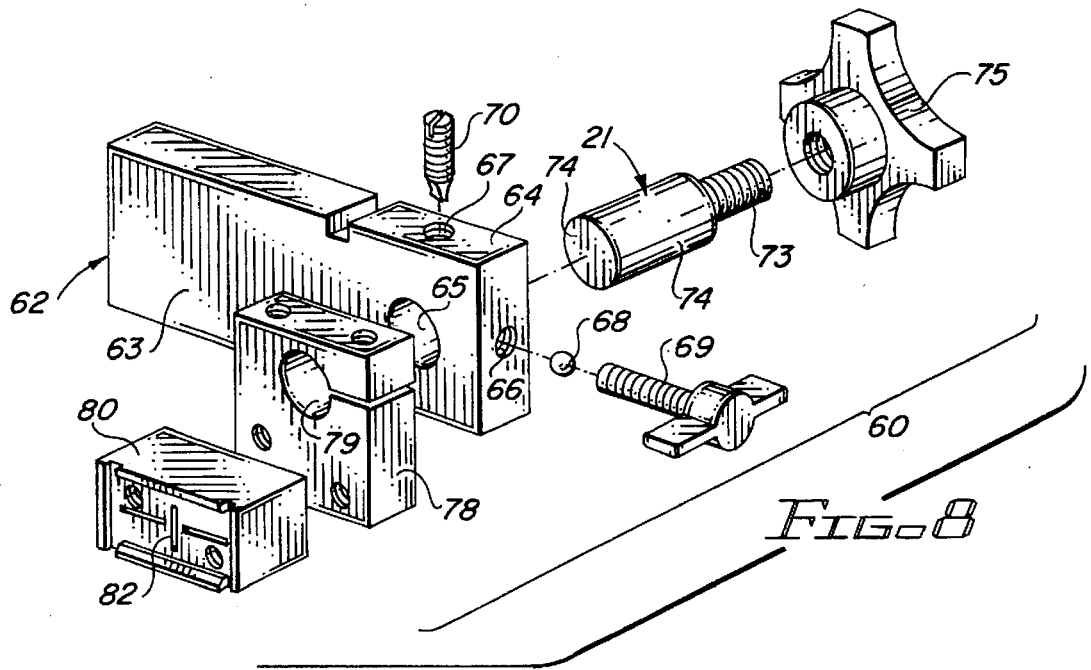

METHOD AND SYSTEM FOR THE MANUFACTURE OF $CO_2$ POWERED DRAGSTER

BACKGROUND OF THE INVENTION

1. Field of the Invention

The present invention relates to a system for the manufacture of a $CO_2$ powered dragster, and a method of making same, which substantially expands the capacity and capability of a conventional low-cost, three axis machine tool in order to efficiently, effectively, and economically perform functions, which are normally only capable of being performed by a number of larger, more complex and more costly machines, in order to produce a three-dimensional work, such as the $CO_2$ powered dragster.

2. Description of the Related Art

There are many large, specialized and complex machining tools and lathes which can be utilized in combination with one another to configure a variety of solid three-dimensional objects. Unfortunately, however, those high capacity machines are quite expensive and are not practical for use by small businesses, designers or hobbyists who wish to independently manufacture a variety of works. As such, those small businesses and hobbyists are often limited by the capacity of their equipment and must turn to other methods, such as hand forming and carving, if they desire to make a work outside the capacity of their conventional tooling.

One relatively low-cost piece of equipment which is commonly implemented and utilized in smaller scale operations, is a three axis machine tool. Such a machine tool conventionally includes a support surface on which a work is secured and as a moving, high-speed, rotating spindle structure on which a machining bit is secured for operation upon the work secured on the support surface. Generally, the rotating spindle of the three axis machine tools is structured and disposed to work along two perpendicular axis in a horizontal plane, namely an X axis and a Y axis, and along a vertical plane, namely the Z axis, as guided conventionally by computer controls. Further, the tool may be configured so that either the spindle moves over the work or the support surface, and therefore the work, moves relative to the spindle.

Unfortunately, however, due to size and cost constraints associated with conventionally available three axis machine tools, such machines often include limited operational ranges and can only move from two (2) to nine (9) inches along the horizontal planes. Additionally, those machines can only approach the work through an upper horizontal surface, and are not capable of efficiently performing multi-bit functions. These limitations can be quite severe if a slightly larger or more complex work is to be machined.

One popular hobbyist activity, which is becoming more and more popular throughout schools in the form of school sponsored projects, relates to the production and manufacture of a $CO_2$ powered dragster. Specifically, these $CO_2$ powered dragsters include aerodynamic wood formed chassis which ride on precisely formed wheels. Conventionally, the wood formed chassis includes a bore at the rear thereof wherein a $CO_2$ cartridge is introduced. During competitions, the $CO_2$ is released from the cartridge and the performance of the car naturally depends upon the precise aerodynamic shaping of the chassis and the wheels. Although most conventional school wood shops include standard, small three axis computer controlled milling machines, the limited capacity and capabilities of those milling machines makes them unusable for the formation of any part of the dragster.

As such, students must generally turn to hand-forming and hand-carving the chassis, a procedure which naturally can limit the aerodynamic shape and precision forming thereof. Further, neither the three axis machine tool nor a conventional, low cost lathe, which may or may not be available, are capable of precision forming the wheels. Accordingly, competitors must turn to buying stock wheels rather than being able to implement any specific performance maximizing wheel designs they have devised. In fact, it is seen that most stock wheels are actually formed by expensive and complex multi-bit or molded lathes, which are totally unrelated to the three axis machine tool which is available.

As previously mentioned, in addition to the limited capacity of the three axis machine tool as it relates to the overall size of the work to be machined, such three axis machine tools are also limited by the fact that they may only approach a work along a single vertical plane. Accordingly, even if a smaller size work were to be machined, limitations on the precision three dimensional forming capabilities of the three axis machine tool are evident. Moreover, no conventionally known machine, tool bit, or attachment is capable of providing the increased capability and capacity required for those larger projects which conventionally can only achieved utilizing a number of different, larger and very expenses pieces of equipment.

Accordingly, there is a substantial need in the art for a system which will significantly expand the capabilities and capacity of a conventional three axis machine tool, and which will provide for effective and efficient manufacture of a $CO_2$ powered dragster chassis and wheels utilizing only that three axis machine tool and the present invention.

SUMMARY OF THE INVENTION

The present invention is directed towards a system for the manufacture of a $CO_2$ powered dragster of the type including an integral, aerodynamic chassis and a plurality of precision wheels, by expanding the capacity and capability of a low-cost, three axis machine tool. Generally, the three axis machine tool is of the type that includes a support surface on which a work is secured and a high-speed, rotating spindle structured and disposed to hold a bit and machine the work. Specifically, the spindle is structured to work, and preferably move, along two perpendicular axis in a horizontal plane, namely an X axis and a Y axis, and along a vertical plane, namely the Z axis.

The system for the manufacture of a $CO_2$ powered dragster of the present invention includes primarily an expansion base and an indexing fixture. The expansion base is structured to be fixedly secured on the support surface of the three axis machine tool in much the same manner as a work would be directly secured to the support surface. Adjustably secured to the expansion base is the indexing fixture. The indexing fixture is structured to provide precise, indexed positioning of a material block from which the work is to be formed in a number of specific, workable positions and orientations.

The indexing fixture itself includes a generally elongate indexing plate. The indexing plate, which has a rear end, a front end, a first side edge, and a second side edge, is structured to be slidingly disposed within the expansion base. Further, secured to the rear end of the indexing plate is a rear end housing. Specifically, the rear end housing, which includes a rear mount portion and rear axis portion, is structured to be secured to the rear end of the indexing plate at its rear end mount portion. Furthermore, the rear end housing is secured and positioned relative to the indexing plate such that the rear axis portion of the rear end housing extends out beyond the first side edge of the indexing plate.

The indexing fixture further includes a front end housing. The front end housing includes a front mount portion and a front axis portion, and is structured to be secured to the front end of the indexing plate at its front mount portion. Accordingly, the front axis portion of the front end housing extends beyond the first side edge of the indexing plate in generally parallel relation to the rear end housing.

Structured to extend through the rear axis portion of the rear end housing is a rear indexing shaft. The rear indexing shaft includes an adjustment end, a clamp end, and a perimeter surface, and extends through the rear axis portion such that the clamp end thereof extends towards and confronts the front axis portion of the front end housing. Conversely, structured to extend through the front axis portion of the front end housing towards the rear axis portion of the rear end housing are front clamping means. In use, the clamp end of the rear indexing shaft is structured to engage a central point of a first end of the material block from which the chassis is to be formed, while the front clamping means are structured to engage a second end of the material block from which the chassis is to be formed. Accordingly, the material block is clampingly suspending therebetween in a workable orientation.

Returning to the indexing plate, it is structured to be secured in one of at least two predefined, spaced apart, linear indexing positions. As such, a corresponding portion of the material block may be selectively positioned within the effective range of linear motion of the spindle. That portion of the material block which is within the range of linear motion of the spindle may therefore be worked upon, while a remaining portion of the material block is maintained precisely aligned for subsequent positioning within the range of linear motion of the spindle. In order to position the remaining portion of the material block within the spindle's range of linear motion the indexing plate is moved to a second of the at least two spaced apart, linear indexing positions.

The indexing fixture further includes rotational indexing means. Specifically, the rotational indexing means are structured to selectively align the rear indexing shaft, and accordingly the front clamping means and the material block secured therebetween, in one of at least two rotational indexing positions. Accordingly, a corresponding surface of the material block is selectively positioned within a range of vertical motion of the spindle for operation thereof, while an additional surface of the material block is maintained precisely aligned for subsequent positioning within the range of vertical motion of the spindle. The additional surface(s) of the material block is placed within the spindle's range of vertical motion when the rotational indexing means realign the rear indexing shaft and the material block into a second of the at least two rotational indexing positions.

The present invention is also directed towards a method of manufacturing a $CO_2$ powered dragster utilizing a low-cost, three axis machine tool. Specifically, the method includes a first step of clampingly securing an expansion base to the support surface of the three axis machine tool, and subsequently securing an indexing fixture in a first of at least two predefined, spaced apart, linear indexing positions on the expansion base. Next, the material block is rotatably clamped within the indexing fixture and is aligned and secured in a first one of at least two rotational indexing positions, as determined by rotational indexing means of the indexing fixtures. As such, a first corresponding surface of the material block is selectively positioned within a range of vertical motion of the spindle.

A machining bit is then operatively positioned within the spindle of the three axis machine tool, and a position of the spindle relative to the material block is controlled in order to machine through the first corresponding surface of the material block within the range of vertical motion of the spindle and at a first linearly indexed portion of the material block. Next, the partially machined material block is rotated into a second rotational indexing position, as determined by the rotational indexing means, thereby selectively positioning a second corresponding surface of the material block within the range of vertical motion of the spindle. The position of the spindle relative to the material block is once again controlled so as to machine through the second corresponding surface of the material block within the range of vertical motion of the spindle and at the first linearly indexed portion of the material block.

The indexing fixtures is than repositioned in a second of the at least two predefined, spaced apart, linear indexing positions. Once repositioned, the material block is once again aligned in the first of the at least two rotational indexing positions. The position of the spindle relative to the material block is then controlled so as to machine through the first corresponding surface of the material block at a second linearly indexed portion of the material block.

Finally, the material block is then rotated into its second rotational indexing position and the spindle position is once again controlled in order to machine through the second corresponding surface of the material block at the second linearly indexed portion of the material block, thereby completing the formation of the aerodynamic chassis.

It is an object of the present invention to provide a system which can be utilized with a low-cost three-axis machine tool in order to effectively and efficiently manufacture a $CO_2$ powered dragster, including the aerodynamic chassis and the precision wheels thereof.

Another object of the present invention is to provide a system which can substantially increase the capacity and capability of a three axis machine tool such that it may perform the functions which are normally only achievable utilizing a variety of different, sophisticated and expensive pieces of equipment.

An additional object of the present invention is to provide a method of manufacturing a $CO_2$ powered dragster utilizing a conventional low-cost, three axis machine tool which would normally not have the capability or capacity to produce such a dragster.

A further object of the present invention is to provide a system which will substantially expand the linear capacity of a standard, three axis machine tool.

Also an object of the present invention is to provide a system which will effectively permit three dimensional, precise, multi-sided machining which is normally not possible utilizing a conventional three axis machine tool.

Still another object of the present invention is to provide a system which will enable a variety of turning operations conventionally associated with lathe procedures to be performed utilizing a three axis machine tool.

Another object of the present invention is to provide a system which can effectively and completely produce a precisely configured, aerodynamic chassis for a $CO_2$ powered dragster.

An additional object of the present invention is to provide a system which can effectively and precisely form substantially thin precision wheels for use on a $CO_2$ powered dragster.

BRIEF DESCRIPTION OF THE DRAWINGS

For a fuller understanding of the nature of the present invention, reference should be had to the following detailed description taken in connection with the accompanying drawings in which:

FIG. 1 is an isolated perspective view of the expansion base and the indexing fixture of the system operatively secured with one another;

FIG. 2 is an exploded perspective view of the expansion base;

FIG. 6 is an isolated perspective view of the rear and housing and rear indexing shaft of the indexing fixture of the system of the present invention;

FIG. 7 is an isolated perspective view of the rear indexing shaft;

FIG. 8 is an exploded perspective view of the front clamping means;

Like reference numerals refer to like parts throughout the several views of the drawings.

DETAILED DESCRIPTION OF THE PREFERRED EMBODIMENT

Figure 9:
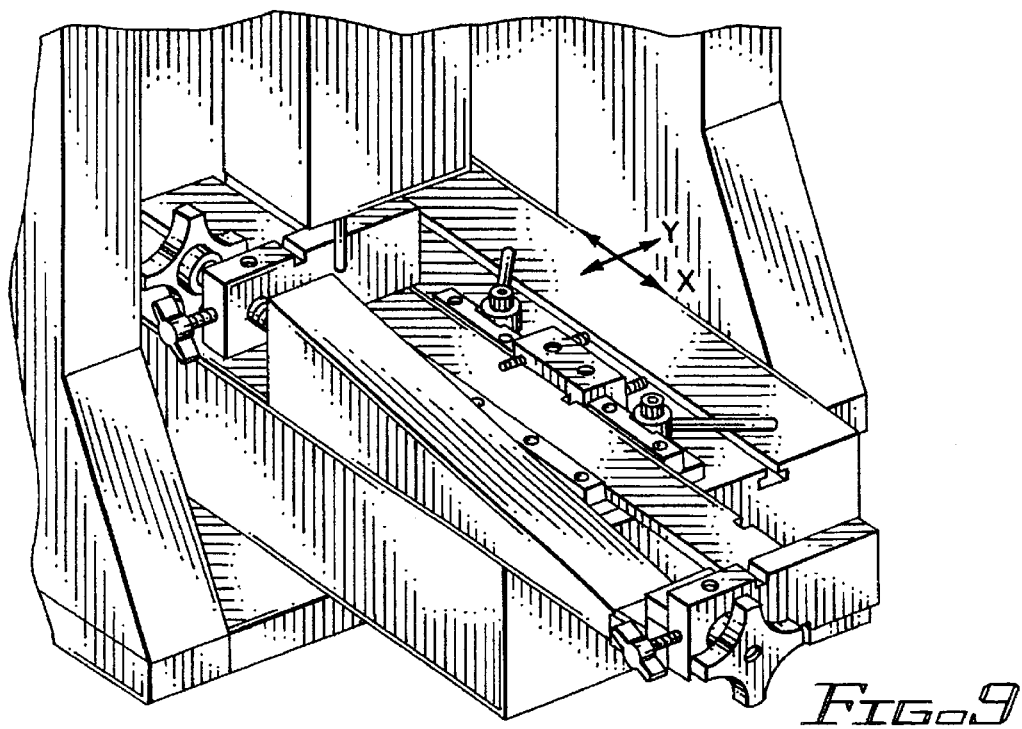
FIG. 9 is a perspective view of the material block mounted within the indexing fixture and positioned in a first rotational indexing position and a first linear indexing position.
Figure 10:
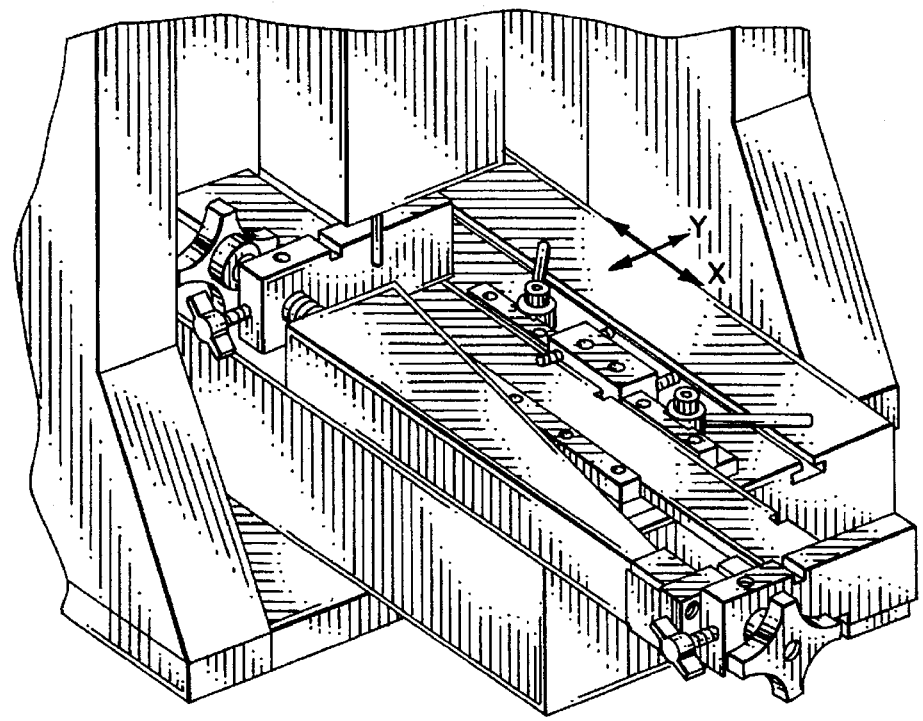
FIG. 10 is a perspective view of the material block secured within the indexing shaft and positioned in the second rotational indexing position and the first linear indexing position.
Figure 11:
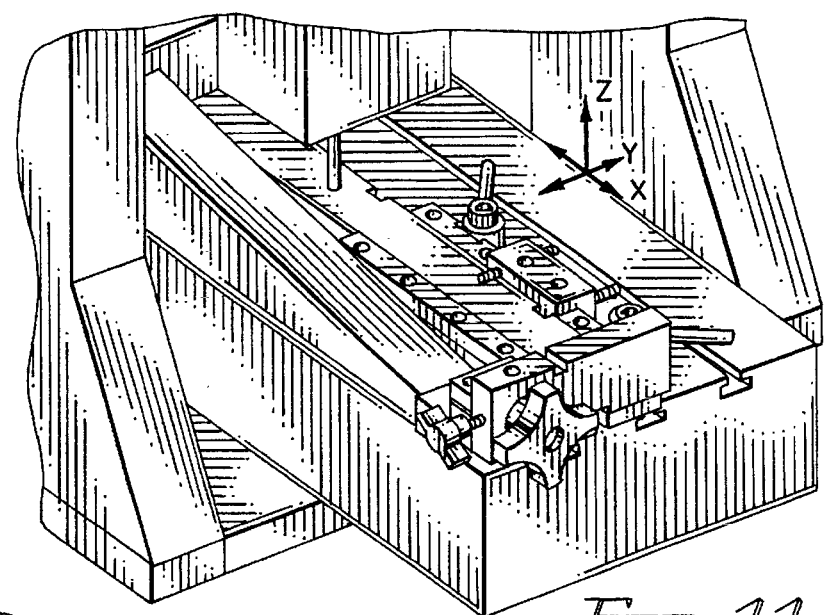
FIG. 11 is a perspective view of the material block secured within the indexing fixture and position in the first rotational indexing position and the second linear indexing position.

Shown throughout the Figures, the present invention is directed towards a system for the manufacture of a $CO_2$ powered dragster and for expanding the capacity and capability of a standard, low-cost, three axis machining tool, generally 100. In particular, this system is structured to be utilized with a low-cost, three axis machine tool 100, as best illustrated in FIGS. 9–12, of the type that preferably includes a support surface 104 onto which a work is normally secured, and a high-speed, rotating spindle 101 that protrudes from a spindle support 102. Specifically, the rotating spindle 101 is structured and disposed to work along two perpendicular axes in a horizontal plane, namely an X axis and a Y axis, as illustrated in FIGS. 9 and 10, as well as vertically along a vertical plane, namely the Z axis, as illustrated in FIG. 11. Further, the system is preferably structured to be used for the manufacture of a $CO_2$ powered dragster of the type that includes in integral, aerodynamic chassis and a plurality of precision wheels, both of which are specifically and precisely modelled in order to achieve maximum performance from the design.

Looking further to the conventional three axis machine tool 100, it should be noted that while the support surface 104 can be configured to move relative to the spindle 101, in the preferred embodiment the spindle support 102, and therefore the spindle 101, will be structured to move relative to the support surface 104. Specifically, the spindle mount 102 of the conventional machine tool 100 will generally be disposed on a pair of perpendicular slides so as to provide for the effective motion along the X and Y axis. Similarly, a vertical slide is included so as to provide for the vertical motion of the spindle along the Z axis and provide for effective machining. As such, such three axis machine tool 100 is preferably computer controlled so as to specifically guide the movements of the spindle 101 and enable a very precise pattern to be machined. Unfortunately, however, the conventional three axis machine tool is limited to a single machining function at a time, cannot operate on the work through more than one plane, and is substantially limited by the capacity of the slides to works of below certain maximum dimensions.

Turning specifically to the system of the present invention, it includes a work surface operatively positioned relative to the spindle 101. While the work surface can include the support surface 104 of the machine tool 100, in the preferred embodiment, the work surface includes an expansion base, generally indicated as 20. The expansion base 20 is structured to be fixedly secured on the support surface 104 of the three axis machine tool 100, in much the same manner as a work would normally be secured to the support surface 104 of the three axis machine tool 100. Accordingly, the expansion base 20 provides a secure firmly disposed engagement with the three axis machine tool 100. The expansion base 20 itself includes a base support 22, which is generally planar and elongate. Disposed atop the base support 22, in generally spaced apart relation from one another, are a stationary guide segment 23 and at least one adjustably disposed cam shoe 24. Specifically, the stationary guide segment 23 preferably extends along an entire length of the base 20 and defines a track between its inner face and preferably a pair of cam shoes 24. Further, structured so as to actuate the camshoes 24 towards the stationary guide segment 23, and thereby reduce an area of the track defined therebetween, is at least one, but preferably a pair of cam lock or screw lock assemblies 25. The cam lock assemblies 25 are structured to rotate on a vertical pivot 26 in order to actuate the cam shoes 24 into and out of a tightening orientation. Moreover, the base 20 includes indexing means, to be described in greater detail subsequently, which facilitates the linear indexed positioning of a material block 95 to be worked on.

Structured to be slidingly and adjustably secured within the expansion base 20 is an indexing fixture, generally indicated as 30. The indexing fixture 30 includes a generally elongate indexing plate 32 having rear end 33, a front end 34, a first side edge 36, and second side edge 35. Further, the indexing plate 32 is structured to slide within the track defined between the stationary guide element 23 and the cam shoes 24 of the expansion base 20 such that the second side edge 35 of the indexing plate 32 slidingly abuts the stationary guide element 23, and actuation of the cam shoes 24 towards the stationary guide segment 23 functions to substantially secure the indexing plate 32 in a desired position within the expansion base 20.

Figure 4:
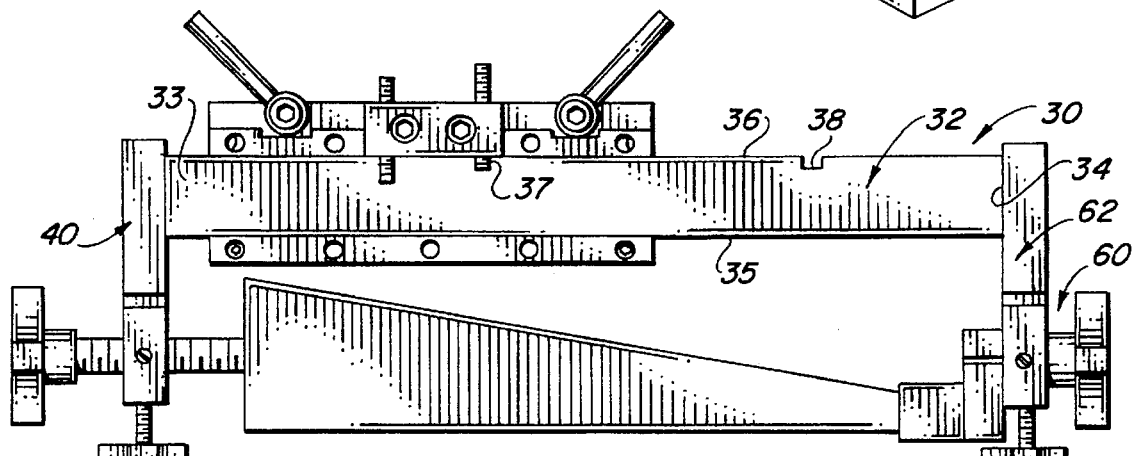
FIG. 4 is a top plan view of the indexing fixture disposed in the first linear indexing position within the expansion base.
Figure 5:
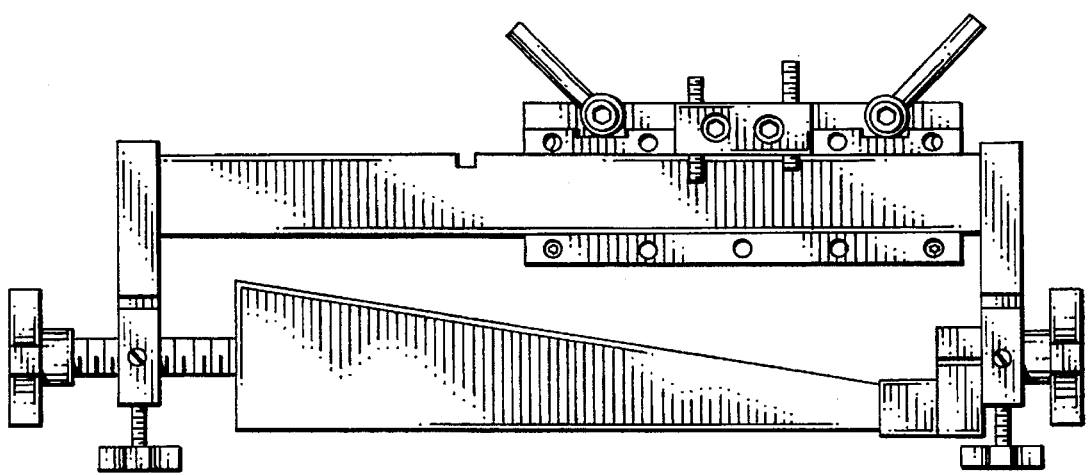
FIG. 5 is a top plan view of the indexing figure disposed in the second linear indexing position within the expansion base.

The indexing means, which as previously recited, are part of the expansion base 20, are structured and disposed to selectively maintain the indexing plate 32 in at least one, but preferably a select one of at least two predefined, spaced apart, linear indexing positions. Preferably, the indexing means include an indexing block 27 mounted to the base support 22, and having at least one, but preferably a pair of apertures 27' and 27" extending therethrough. Specifically, the aperture 27" is structured to receive an indexing pin 29 therethrough. The indexing pin 29 is specifically structured and disposed to pass through the indexing block 27 and be selectively introduced into a corresponding one of at least two spaced apart slots 37 and 38 formed in the first side edge 36 of the indexing plate 32. As such, the indexing pin 29 functions to maintain the indexing plate 32 non-slidably within a select one of the predetermined linear indexing positions. As illustrated in FIGS. 4 and 5, the first linear indexing position includes the indexing pin 29 engaging the slot 37 formed near to the rear end 33 of the indexing plate 32, such that an indexed portion of the work towards the rear end 33 of the indexing plate will be within the range of movement of the spindle 101 of the three axis machine tool 100. Conversely, the second slot 38 is disposed closer to the front end 34 of the indexing plate 32 and when the indexing pin 29 is disposed therein, the indexing plate 32 is maintained such that an indexed portion of the work towards the front end 34 of the indexing plate 32 is maintained within the range of motion of the spindle 101 of the three axis machine tool 100. Because the positioning and location of the slots 37 and 38 are precise and consistent, the computer control means of the three axis machine tool can be configured so as to provide for the machining of a first indexed portion of the work initially, and a second indexed portion of the work subsequently, as described in greater detail as part of the method to be described hereafter.

Also included as part of the indexing means is a second indexing pin 28 which extends through the aperture 27'. Preferably, this indexing pin 28 is structured to extend over a top surface of the indexing plate 32 so as to substantially hold down the indexing plate 32 and maintain it securely retained within the expansion base 20.

Turning to the indexing fixture 30, it includes a rear end housing, generally 40, secured at the rear end 33 of the indexing plate 32. Specifically, the rear end housing 40 is preferably of solid construction and includes a rear mount portion 42 and a rear axis portion 44. Specifically, it is the rear mount portion 42 of the rear end housing 40 which is secured to the indexing plate 32, such that the rear end housing 40 extends generally perpendicularly upward from the indexing plate 32 and such that the rear axis portion 44 of the rear end housing 40 extends outwardly beyond the second side edge 35 of the indexing plate 32. Similarly, a front end housing 62, which includes a front mount portion 63 and a front axis portion 64, is structured to be secured at the front end 34 of the indexing plate 32. Much like the rear end housing 40, the front end housing 62 is structured to be generally vertically disposed, and secured at the front mount portion 63 thereof to the indexing plate 32, such that the front axis portion 64 extends beyond the second side edge 35 of the indexing plate 32. As such, the rear end housing 40 and the front end housing 62 are preferably disposed in generally parallel, spaced apart relation from one another such that their corresponding rear and front axis portions 44 and 64 generally confront one another.

Structured to extend through the rear axis portion 45 of the rear end housing 40, is a rear indexing shaft 50. The rear indexing shaft 50 includes an adjustment end 64, a clamp end 51, and a perimeter surface 53. Further, the rear indexing shaft 50 is generally elongate so as to provide for variable longitudinal introduction through the rear axis portion 44 of the rear end housing 40 so that the clamp end 51 thereof extends towards and confronts the front axis portion 64 of the front end housing 62. Furthermore, the clamping end 51 of the rear indexing shaft 50 preferably includes a plurality of spurs 52 disposed thereon and structured to facilitate secure engagement of the work. Conversely, the adjustment end 54 of the rear indexing shaft 50 is preferably secured with a handle member 55. The handle member 55 is structured to facilitate rotation of the rear indexing shaft 50, when appropriate, and/or introduction or withdrawal of the rear indexing shaft 50 through the rear axis portion 44 of the rear end housing 40.

Included with the front end housing 62, and structured to provide opposing engagement of the work are front clamping means, generally indicated as 60. The front clamping means 60 extend through the front axis portion 64 of the front end housing 62 towards the rear axis portion 44 of the rear end housing 40, and thereby functions suspend the work in conjunction with the clamp end 51 of the rear indexing shaft 50.

Figure 3:
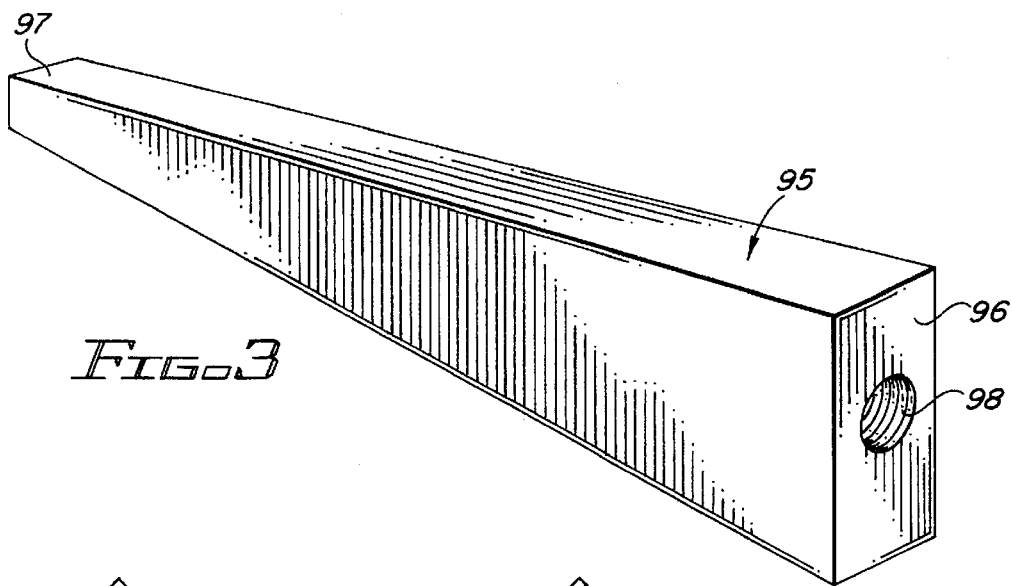
FIG. 3 is an isolated perspective view of the material block from which the aerodynamic chassis is formed.

Preferably, the work includes a material block 95, such as that illustrated in FIG. 3, from which the finished product is to be produced. This material block 95 can take on any of a variety of configurations, depending on the final product to be produced. However, in the case of the chassis of the $CO_2$ powered dragster, the material block 95 is preferably formed of wood and includes a generally trapezoidal configuration. Specifically, the material block 95 from which the chassis is to be formed, includes a first end 96 structured to be engaged by the clamp end 51 of the rear indexing shaft 50, and a second end 97 structured to be engaged by the front clamping means 60. Moreover, because the rear end housing 40 and front end housing 62 extend beyond the second edge 35 of the indexing shaft 32, the material block 95 is freely suspended without any underlying portions of the system obstructing effective machining of the material block 95. Preferably, the first end 96 of the material block 95 of the present invention is generally larger than the second end 97, and as such the first end 96 is configured to form a rear portion of the chassis of the $CO_2$ powered dragster, while the second end 97 is structured to form the generally tapered and aerodynamically styled front end of the chassis. Furthermore, as the standard $CO_2$ powered dragster is structured to receive a $CO_2$ canister in a rear portion thereof, a preformed axial bore 98 is formed through the first end 96 of the material block 95. This axial bore 98 also functions to receive the clamp end 51 of the rear indexing shaft 50 therein so as to effectively support the material block 95. Additionally, the axial bore 98 is disposed at a central point of the first end 96 and is aligned with a central axis of the material block 95. As such, the rear indexing shaft 50 serves as a central axis of rotation through the central axis of the asymmetrically configured material block 95.

Turning once again to the front clamping means 60, in the preferred embodiment it is structured to engage the second end 97 of the material block 95 in such a manner that clamped rotation of the material block 95 will still be about the central axis of the material block 95. Such rotation is directed by rotation of the rear indexing shaft 50 which lies along the central axis. In particular, the front clamping means 60 include a front indexing shaft 71 which is structured to extend through an opening 65 disposed in the front axis portion 64 of the front end housing 62 along a central axis equivalent to the rotational axis of the rear indexing shaft 50. Moreover, the front indexing shaft 71 similarly includes a front end 72 which extends through the front end housing 62 towards the rear end housing 40, and an attachment end 73 which is preferably structured to engage a handle 75 so as to facilitate rotation and introduction thereof through the front end housing 62. Through the front end housing 62, the front indexing shaft 71 is structured to engage spur block means, which connect therewith. Specifically, the spur block means include a spur block eccentric adapter 78, which includes an adjustably tightenable aperture 79 into which the front indexing shaft 71 extends. As such, due to the secure engagements between the front indexing shaft 71 and the spur block eccentric adapter 78, rotation of the front indexing shaft 71 results in corresponding rotation of the spur block eccentric adapter 78 about an axis of rotation defined by the front indexing shaft 71. Secured, preferably to an extended end of the spur block eccentric adapter 78 is a spur block 80. The spur block 80 includes a plurality of spurs 82 disposed on a front end thereof so as to securely and clampingly receive the second end 97 of the material block 95 therein. Accordingly, rotation of the rear indexing shaft 50 results in corresponding rotation of the front indexing shaft 71 and the material block 95 suspended therebetween, while maintaining precise central axis alignment of the material block 95 as it rotates thereabout. It should be noted than when working with a block that is symmetrically configured, the spur block eccentric adapter 78 and spur block 80 may be removed such that the front indexing shaft 71 directly engages a front end of the block.

The system of the present invention further includes rotational indexing means. The rotational indexing means are structured to selectively align and secure the rear indexing shaft 50, and accordingly, the front clamping means 60 and the material block 95 secured therebetween, in one of at least two rotational indexing positions. As such, the rotational indexing means function to selectively position a corresponding surface of the material block 95 within a range of vertical motion of the spindle 101 for operation thereof, while an additional surface of the material block 95 is maintained precisely aligned for subsequent positioning within that range of vertical motion of the spindle 101. In the preferred embodiment, the rotational indexing means includes a plurality of detentes 56 disposed about the perimeter surface 53 of the rear indexing shaft 50. Preferably four of the detentes 56 are included and spaced 90 degrees from one another, thereby defining four of the rotational indexing positions. The plurality of detentes 56 of the rear indexing shaft 50 are preferably aligned to correspond with the portion of the rear end housing 40 which surrounds the rear indexing shaft 50. As such, the rotationally indexing means will further include an indexing plunger 46 that extends into an aperture 45 formed in the rear end housing 40. The indexing plunger 46 is structured to selectively engage a select one of the detentes 56 and thereby align the rear indexing shaft 50 precisely in one of the rotational indexing positions. Similarly, and so as to provide for additional precision in alignment of the material block 95 within the select rotational indexing position, in a preferred embodiment the front indexing shaft 71 also includes a plurality of detentes 74 formed in a perimeter surface thereof. The detentes 74 of the front indexing shaft 71 are structured to be similarly engaged by an indexing plunger 70, which extends into the front end housing 62 for appropriate selective engagement with the detentes 74.

Additionally, so as to maintain at least the rear indexing shaft 50, but preferably both the rear indexing shaft 50 and front indexing shaft 71 securely in the select rotational indexing position, the rotational indexing means further include a rotary indexing lock assembly 44 and 69. As best seen in FIG. 8, the rotary indexing lock assembly 47 and 69 are structured to direct a ball bearing 68 disposed within a side aperture 66 of the front end housing 62 and a corresponding aperture in the rear end housing 40 against the shaft. The ball bearing 68 when urged against the rear indexing shaft 50 and front indexing shaft 71 will engage the 90 degree offset detentes 56 or 74 and will further prevent either indexing shaft from rotating, such as due to the weight of the material block 95. It is therefore seen that the material block 95 may be worked upon by a machining bit within the spindle 101 through a first surface, and be precisely and consistently rotated so as to permit the material block 95 to be effectively and appropriately worked upon through another exterior surface of the material block 95.

Generally, the movement of the spindle is controlled by computer control means which are able to direct precise movements. Because of the linear and rotational indexing functions of the system of the present invention, the computer control means can be accurately programmed with multiple machining sequences, one at each indexed position, and alignment errors are eliminated as the new start point for subsequent machining sequences are precisely defined.

Figure 12:
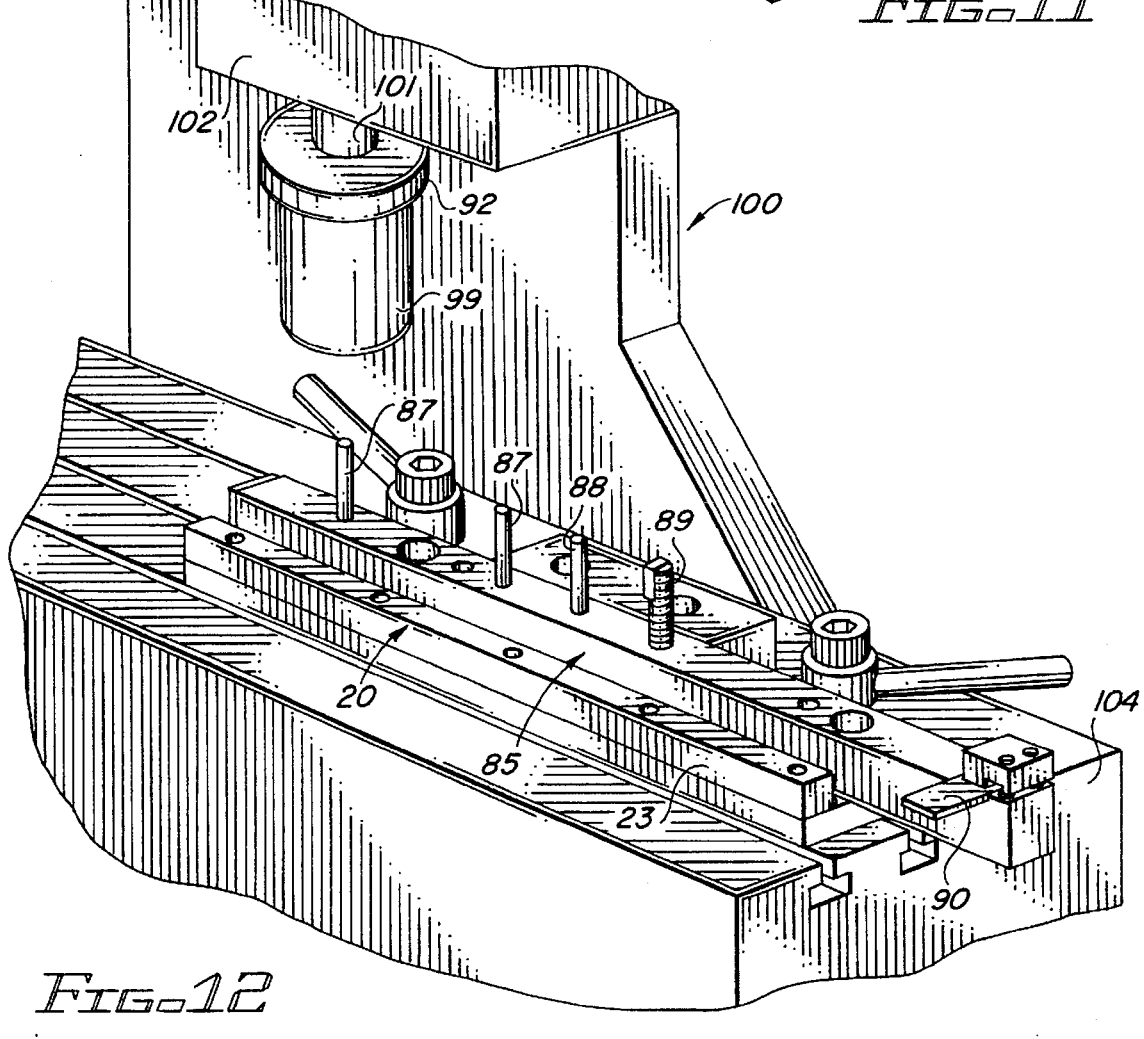
FIG. 12 is a perspective view of the turning fixture assembly operatively installed and positioned.

In addition to the indexing fixture 30, the system of the present invention will also preferably include a turning fixture assembly, best illustrated in FIG. 12. The turning fixture assembly is structured to facilitate production of a plurality of precision wheels from a single, preferably cylindrical, material blank 99, utilizing only the three axis machine tool 100. The turning fixture assembly includes primarily a tool bar 85 and chuck 92. In particular, the tool bar 85 is structured to be securely retained within the expansion base 20, so as to appropriately position a plurality of machine tool bits that extend operatively from the tool bar 85. The machine tools bits, which are disposed a precise, spaced apart distance from one another along the tool bar 85 preferably will include a center drill bit 86, a conventional drill bit 87, a reamer bit 88, and a combination outside diameter and inside diameter turning bit 89. These bits all preferably extend vertically upward from the tool bar 85, so as to be operatively positioned as will be described subsequently. In addition to the preceding machine tool bits, a horizontally oriented cutoff tool 90 is also preferably included on the tool bar 85 and is structured and disposed to sever a finished one of the procession wheels from the preferably cylindrical material blank 99 utilized in the formation thereof. Specifically, the preferably cylindrical material blank 99, which may be of a plastic type material, is securely held by the chuck 92. The chuck 92 is connected with the spindle 101, such that rotation of the spindle 101 results in corresponding rotation of the chuck 92 and the material blank 99 securely held therein. As such, during movement of the spindle 101, including rotation thereof, the material blank 99 is selectively and appropriately positioned over, and lowered onto the stationary and operatively disposed machine tool bits 87, 88, 89, and 90. In this manner, by causing the blank and not the bit to rotate, the computer control means of the three axis machine tool 100 can be utilized to precisely run a series of turning operations and manufacture a number of wheels from the single material blank 99.

The system of the present invention including the indexing fixture 30, and preferably also the turning fixture assembly 85 and 92, are included as part of a method of manufacturing a $CO_2$ powered dragster, of the type that includes an integral aerodynamic chassis and a plurality of precision wheels, utilizing the low-cost three axis machine tool 100, as previously described. The method involves an initial step of clampingly securing the expansion base 20 to the support surface 104 of the three axis machine tool 100. Once secured, the indexing fixture is secured in a first of its at least two predefined, spaced apart linear indexing positions on the expansion base 20, such as by positioning the indexing pin 29 into a first of the slots 37. Next, the material block 95 is clamped, rotatably within the indexing fixture 30, preferably between the rear indexing shaft 50 and the spur block 80. Then, the material block 92 is aligned in a first of the rotational indexing positions, as determined by the rotational indexing means of the indexing fixture 30 and is secured in that orientation, thereby selectively positioning a first corresponding surface of the material block 95 within a range of vertical motion of the spindle, as illustrated in FIG. 9.

A machine bit is then in operatively positioned within the spindle 101 of the three axis machine tool 100, and a position thereof is controlled, preferably by the computer control means, so as to effectively machine through the first corresponding surface of the material block 95, which is within the range of vertical motion of the spindle 101 at a first linearly indexed portion of the material block 95. Once this first machining sequence is completed through the first corresponding surface of the material block 95, the partially machined material block 95 is rotated into and secured in a second rotational indexing position, also as determined by the rotational indexing means of the indexing fixture 30, as illustrated in FIG. 10. Accordingly, a second corresponding surface of the material block 95 is selectively positioned within the range of vertical motion of the spindle 101. At that point, the position of the spindle 101 over the material block 95 is once again controlled in accordance with a second pre-programmed machining sequence in order to machine through the second corresponding surface of the material block 95 at the first linearly indexed portion of the material block 95. At this point, the first linearly indexed portion of the material block 95, and in the preferred embodiment precisely half of the material block 95 should be completely machined and formed, as necessary.

The next step therefore involves repositioning the indexing fixture 30 in a second of the predefined spaced apart linear indexing positions by removing the indexing pin 29 from the first slot 37, sliding the indexing plate 32, and repositioning the indexing pin 29 within the second slot 38 of the indexing plate 32. The material block 95 may then once again be aligned the order of the machining sequences programmed by the computer in the first of the two rotational indexing positions, as illustrated in FIG. 11, although it is noted that depending on control means the second rotational indexing position may be maintained. In the preferred embodiment, however, the first corresponding surface of the material block 95 is selectively positioned within the range of vertical motion of the spindle 101 for subsequent controlled positioning of the spindle thereover in order to machine through the first corresponding surface of the material block 95 at a second linearly indexed portion of the material block 95. Once that operation is completed, the material block 95 is rotated once again into the second rotational indexing position, thereby selectively positioning the corresponding surface back into the range of vertical motion of the spindle 101, and the position of the spindle 101 over the material block 95 is controlled so as to machine through the second corresponding surface of the material block 95 at the second linearly indexed portion of the material block, and in the preferred embodiment completely form the aerodynamic chassis.

In the preferred embodiment of the present invention, the method also includes steps for the formation of the required procession wheels. Accordingly, subsequent to completing the proceeding steps, the indexing fixture 30 is removed from the expansion base 30, and a tool bar 85 is operative secured within the expansion base 20. The machine bit is then removed from the spindle 101 and the chuck 92 is secured to the spindle 101. A preferably cylindrical material blank 99, from which the precision wheels are to be formed, is then secured within the chuck 92.

By moving the spindle 101, the material blank 99 is then centered over the centered drill bit 86 of the tool bar 85, and while rotating is lowered onto the centered drill bit 86 in order to center drill the material blank 99. Next, the material blank 99 is positioned over the conventional drill bit 87 and while rotating is selectively moved onto the conventional drill bit 87 so as to effectively drill the material blank 99 as necessary, and as preferably guided by the computer control means which are able to determine the precise position and configuration required due to the precise spacing between the bits on the tool bar. The material blank 99 is then positioned over the reamer bit. At that point, the rotating material blank 99 is selectively moved onto the reamer bit 88 for effective reaming thereof. Subsequently, the rotating material blank 99 is positioned over the combination outside diameter and inside diameter turning bit 89 and is selectively lowered thereon so as to effectively turn an outside and an inside of the material blank 99 and thereby complete the definition of a precision wheel at a free end of the material blank 99. Finally, the material blank 99 is passed across the cutoff tool 90, so as to separate the precision wheel from the material blank 99. Once the first precision wheel has been formed, the preceding steps beginning with the positioning of the material blank 99 over the conventional drill bit 87 are repeated until all of the precision wheels are properly and effectively formed.

As such, it is seen that utilizing the system and method of the present invention a hobbyist is able to precisely and efficiently form the entire aerodynamic chassis of the $CO_2$ powered dragster, and is able to independently form the precision wheels to a greater aerodynamic configuration than would be possible merely by ordering stock formed wheels.

Since many modifications, variations and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

Now that the invention has been described,

What is claimed is:

1. To be utilized with a low cost, 3 axis machine tool of the type including a high speed, rotating spindle structured and disposed to work along two perpendicular axis in a horizontal plane, namely an X axis and a Y axis, and along a vertical plane, namely the Z axis, a system for the manufacture of a $CO_2$ powered dragster of the type including an integral, aerodynamic chassis, said system comprising:

(a) a work surface operatively disposed relative to the rotating spindle,
   (b) an indexing fixture structured to be adjustably secured to said work surface, said indexing fixture comprising:
      a generally elongate indexing plate, said indexing plate including a rear end, a front end, a first side edge and a second side edge,
      said indexing plate being structured to be slidingly disposed relative to said work surface, a rear end housing, said rear end housing including a rear mount portion and a rear axis portion, said rear end housing being structured to be secured at said rear mount portion thereof to said rear end of said indexing plate such that said rear axis portion of said rear end housing extends beyond said second side edge of said indexing plate, a front end housing, said front end housing including a front mount portion and a front axis portion, said front end housing being structured to be secured at said front mount portion thereof to said front end of said indexing plate such that said front axis portion of said front end housing extends beyond said second side edge of said of said indexing plate, a rear indexing shaft, said rear indexing shaft including an adjustment end, a clamp end, and a perimeter surface, said rear indexing shaft being structured to extend through said rear axis portion of said rear end housing such that said clamp end confronts said front axis portion of said front end housing, front clamping means structured and disposed to extend through said front axis portion of said front end housing towards said rear axis portion of said rear end housing, said clamp end of said rear indexing shaft being structured to engage a central point of a first end of a material block from which the chassis is to be formed and said front clamping means being structured to engage a second end of the material block from which the chassis is to be formed so as to clampingly suspend said material block therebetween, said indexing plate being structured to be secured in at least one pre-defined, linear indexing position so as to selectively position a corresponding portion of the material block within a range of linear motion of the spindle for operation thereof while maintaining a remaining portion of the material block precisely aligned for subsequent positioning within said range of linear motion of the spindle, and rotational indexing means structured and disposed to selectively align said rear indexing shaft, and accordingly said front clamping means and the material block secured therebetween, in one of at least two rotational indexing position so as to selectively position a corresponding surface of the material block within a range of vertical motion of the spindle for operation thereof while maintaining an additional surface of the material block precisely aligned for subsequent positioning within said range of vertical motion of the spindle.

2. A system as recited in claim 1 wherein said work surface includes a support surface of the 3 axis machine tool.

3. A system as recited in claim 1 wherein said work surface includes an expansion base structured to be fixedly secured on a support surface of the 3 axis machine tool.

4. A system as recited in claim 3 wherein said expansion base comprises:

a stationary guide segment along which said second side edge of said indexing plate slidingly abuts, and at least one adjustably disposed clamp shoe structured and disposed to be actuated into clamping abutment with said first side edge of said indexing plate.

5. A system as recited in claim 4 wherein said expansion base further includes at least one cam lock assembly structured and disposed to actuate said cam shoe into said clamping abutment with said first side edge of said indexing plate.

6. A system as recited in claim 3 wherein said expansion base further comprises:

indexing means structured and disposed to selectively maintain said indexing plate in said at least one pre-defined, linear indexing position, said indexing means including an indexing pin, and said indexing pin being structured and disposed to be selectively introduced into a slot formed in said first side edge of said indexing plate so as to maintain said indexing plate non-slidingly within said pre-defined linear indexing position.

7. A system as recited in claim 6 including at least two pre-defined, spaced apart, linear indexing positions so as to selectively position said corresponding portion of the material block within said range of linear motion of the spindle.

8. A system as recited in claim 7 wherein said indexing plate includes at least two spaced apart slots formed in said first side edge thereof and structured to selectively receive said indexing pin therein.

9. A system as recited in claim 1 wherein said rotational indexing means comprises:

a plurality of detentes disposed at selectively spaced apart intervals about said perimeter surface of said rear indexing shaft, and an indexing plunger structured to engage one of said detentes so as to align said rear indexing shaft in said one of at least two rotational indexing positions.

10. A system as recited in claim 9 wherein said rotational indexing means further includes a rotary indexing lock assembly structured and disposed to secure said rear indexing shaft in said one of at least two rotational indexing positions.

11. A system as recited in claim 1 wherein said clamp end of said rear indexing shaft includes a plurality of spurs defined therein and structured to engage said material block.

12. A system as recited in claim 1 wherein said front clamping means are structured to engage said second end of an asymmetrically oriented material block, wherein said second end is not aligned with a central axis of said material block extending through said central point of said first end of said material block, and provide clamped rotation of said material block about said central axis upon rotation of said rear indexing shaft.

13. A system as recited in claim 12 wherein said front clamping means comprise:

a front indexing shaft structured to extend through said front axis portion of said front end housing towards said rear axis portion of said rear end housing along said central axis of said material block, and spur block means connected with said front indexing shaft and structured to engage said second end of said material block for rotation thereof about said front indexing shaft and accordingly said central axis of said material block.

14. A system as recited in claim 1 wherein said clamp end of said rear indexing shaft is structured and disposed to be introduced into an axial bore extending into said material block through said first end thereof.

15. A system as recited in claim 1 further comprising a turning fixture assembly structured and disposed to facilitate production of said plurality of precision wheels from a single, cylindrical, material blank, utilizing only the 3 axis machine tool, said turning fixture assembly comprising:

a tool bar structured and disposed to be clampingly secured in said work surface, said tool bar including a plurality of machine tool bits extending operatively therefrom, said machine tool bits being disposed a precise, spaced apart distance from one another, and a chuck rotatably secured to the spindle of the 3 axis machine tool, said chuck being structured to hold said cylindrical material blank rotatably therein for three axis, rotating positioning thereof over a select one of said plurality of machine tool bits.

16. A system as recited in claim 15 wherein said plurality of machine tool bits includes a horizontally oriented, cutoff tool structured and disposed to sever a finished one of said precision wheels from said cylindrical, material blank.

17. A system as recited in claim 15 wherein said plurality of machine tool bits includes a center drill bit.

18. A system as recited in claim 15 wherein said plurality of machine tool bits includes a conventional drill bit.

19. A system as recited in claim 15 wherein said plurality of machine tool bits includes a reamer bit.

20. A system as recited in claim 15 wherein said plurality of machine tool bits includes a combination outside diameter and inside diameter turning bit.

21. A system as recited in claim 1 further including computer control means structured to guide the position of the spindle relative to said material block in select, indexed stages so as to define the completed chassis.

22. To be utilized with a low cost, 3 axis machine tool of the type including a high speed, rotating spindle structured and disposed to work along two perpendicular axis in a horizontal plane, namely an X axis and a Y axis, and along a vertical plane, namely the Z axis, a 3 axis machine tool, capacity and capability expansion system, said system comprising:

(a) a work surface operatively disposed relative to the rotating spindle, (b) an indexing fixture structured to be adjustably secured to said work surface, said indexing fixture comprising:
a generally elongate indexing plate, said indexing plate including a rear end, a front end, a first side edge and a second side edge,
said indexing plate being structured to be slidingly disposed relative to said work surface,
a rear end housing, said rear end housing including a rear mount portion and a rear axis portion,
said rear end housing being structured to be secured at said rear mount portion thereof to said rear end of said indexing plate such that said rear axis portion of said rear end housing extends beyond said second side edge of said indexing plate,
a front end housing, said front end housing including a front mount portion and a front axis portion,
said front end housing being structured to be secured at said front mount portion thereof to said front end of said indexing plate such that said front axis portion of said front end housing extends beyond said second side edge of said indexing plate,
a rear indexing shaft, said rear indexing shaft including an adjustment end, a clamp end, and a perimeter surface,
said rear indexing shaft being structured to extend through said rear axis portion of said rear end housing such that said clamp end confronts said front axis portion of said front end housing,
front clamping means structured and disposed to extend through said front axis portion of said front end housing towards said rear axis portion of said rear end housing,
said clamp end of said rear indexing shaft being structured to engage a central point of a first end of a material block from which the work is to be formed and said front clamping means being structured to engage a second end of the material block from which the work is to be formed so as to clampingly suspend said material block therebetween,
said indexing plate being structured to be secured in at least one pre-defined, linear indexing position so as to selectively position a corresponding portion of the material block within a range of linear motion of the spindle for operation thereof while maintaining a remaining portion of the material block precisely aligned for subsequent positioning within said range of linear motion of the spindle, and
rotational indexing means structured and disposed to selectively align said rear indexing shaft, and accordingly said front clamping means and the material block secured therebetween, in one of at least two rotational indexing positions so as to selectively position a corresponding surface of the material block within a range of vertical motion of the spindle for operation thereof while maintaining an additional surface of the material block precisely aligned for subsequent positioning within said range of vertical motion of the spindle upon said rotational indexing means selectively aligning said rear indexing shaft, and accordingly said front clamping means and the material block secured therebetween, in a second of said at least two rotational indexing positions, and (c) said work surface comprising:
indexing means structured and disposed to selectively maintain said indexing plate in said at least one pre-defined, linear indexing position,
said indexing means including an indexing pin, and
said indexing pin being structured and disposed to be selectively introduced into a corresponding slot formed in said first side edge of said indexing plate so as to maintain said indexing plate non-slidingly within said pre-defined linear indexing positions.

23. A system as recited in claim 22 wherein said work surface includes an expansion base structured to be fixedly secured on a support surface of the 3 axis machine tool.

24. A system as recited in claim 22 including at least two pre-defined, spaced apart, linear indexing positions so as to selectively position said corresponding portion of the material block within said range of linear motion of the spindle.

25. A system as recited in claim 24 wherein said indexing plate includes at least two spaced apart slots formed in said first side edge thereof and structured to selectively receive said indexing pin therein.

26. A system as recited in claim 23 wherein said expansion base comprises:
a stationary guide segment along which said second side edge of said indexing plate slidingly abuts, and
an adjustably disposed clamp shoe structured and disposed to be actuated into clamping abutment with said first side edge of said indexing plate.

27. A system as recited in claim 22 wherein said rotational indexing means comprises:
a plurality of detentes disposed at selectively spaced apart intervals about said perimeter surface of said rear indexing shaft,
an indexing plunger structured to engage one of said detentes so as to align said rear indexing shaft in said one of at least two rotational indexing positions, and
a rotary indexing lock assembly structured and disposed to secure said rear indexing shaft in said one of at least two rotational indexing positions.

28. A system as recited in claim 22 wherein said front clamping means are structured to engage said second end of an asymmetrically oriented material block, wherein said second end is not aligned with a central axis of said material block extending through said central point of said first end of said material block, and provide clamped rotation of said material block about said central axis upon rotation of said rear indexing shaft.

29. A system as recited in claim 28 wherein said front clamping means comprise:
- a front indexing shaft structured to extend through said front axis portion of said front end housing towards said rear axis portion of said rear end housing along said central axis of said material block, and
- spur block means connected with said front indexing shaft and structured to engage said second end of said material block for rotation thereof about said front indexing shaft and accordingly said central axis of said material block.

30. A system as recited in claim 22 further comprising a turning fixture assembly structured and disposed to facilitate production of a secondary work from a single material blank, utilizing only the 3 axis machine tool, said turning fixture assembly comprising:
- a tool bar structured and disposed to be clampingly secured in said work surface,
- said tool bar including a plurality of machine tool bits extending operatively therefrom,
- said machine tool bits being disposed a precise, spaced apart distance from one another, and
- a chuck rotatably secured to the spindle of the 3 axis machine tool, said chuck being structured to hold the material blank rotatably therein for three axis, rotating positioning thereof over a select one of said plurality of machine tool bits.

31. A system as recited in claim 22 further including computer control means structured to guide the movement of the spindle over said material block in select, indexed stages so as to define the completed work.

32. A method of manufacturing a $CO_2$ powered dragster, of the type including an integral, aerodynamic chassis and a plurality of precision wheels, utilizing a low cost, 3 axis machine tool of the type including a high speed, rotating spindle structured and disposed to work along two perpendicular axis in a horizontal plane, namely an X axis and a Y axis, and along a vertical plane, namely the Z axis, said method comprising the steps of:
- (a) operatively positioning said rotating spindle relative to a work surface,
- (b) securing an indexing fixture in a first of at least two pre-defined, spaced apart, linear indexing positions on said work surface,
- (c) clamping a material block rotatably within said indexing fixture,
- (d) aligning and securing said material block secured within said indexing fixture in a first one of at least two rotational indexing positions, as determined by rotational indexing means of said indexing fixture, so as to selectively position a first corresponding surface of said material block within a range of vertical motion of the spindle,
- (e) operatively positioning a machining bit within the spindle of the 3 axis machine tool,
- (f) controlling a position of the spindle relative to said material block so as to machine through said first corresponding surface of said material block within said range of vertical motion of the spindle at a first linearly indexed portion of said material block,
- (g) rotating, aligning and securing said material block into a second rotational indexing position, as determined by said rotational indexing means of said indexing fixture, so as to selectively position a second corresponding surface of said material block within said range of vertical motion of the spindle,
- (h) controlling the position of the spindle relative to said material block so as to machine through said second corresponding surface of said material block within said range of vertical motion of the spindle at said first linearly indexed portion of said material block,
- (i) re-positioning said indexing fixture in a second of at least two pre-defined, spaced apart, linear indexing positions,
- (j) aligning and securing said material block secured within said indexing fixture in said first one of at least two rotational indexing positions, as determined by rotational indexing means of said indexing fixture, so as to selectively position said first corresponding surface of said material block within said range of vertical motion of the spindle,
- (k) controlling the position of the spindle relative to said material block so as to machine through said first corresponding surface of said material block within said range of vertical motion of the spindle at a second linearly indexed portion of said material block,
- (l) rotating, aligning and securing said material block into said second rotational indexing position, as determined by said rotational indexing means of said indexing fixture, so as to selectively position said second corresponding surface of said material block within said range of vertical motion of the spindle, and
- (m) controlling the position of the spindle relative to said material block so as to machine through said second corresponding surface of said material block within said range of vertical motion of the spindle at said second linearly indexed portion of said material block so as to complete the formation of the aerodynamic chassis.

33. A method as recited in claim 32 further comprising the steps of:
- (a) removing the indexing fixture from the work surface,
- (b) securing a tool bar, which includes a center drill bit, a conventional drill bit, a reamer bit, a combination outside diameter and inside diameter turning bit, and a cutoff tool operatively secured in spaced part relation therein, to said work surface,
- (c) removing the machining bit from the spindle,
- (d) securing a chuck to the spindle,
- (e) securing a material blank within said chuck,
- (f) rotating said chuck and accordingly said material blank secured therein at high speeds,
- (g) centering said material blank over the center drill bit of the tool bar,
- (h) lowering said material blank onto the center drill bit so as to center drill said material blank, (i) positioning said material blank over the conventional drill bit, (j) moving said material blank selectively onto the conventional drill bit so as to effectively drill said material blank, (k) positioning said material blank over the reamer bit, (l) moving said material blank selectively onto the reamer bit so as to effectively ream said material blank, (m) positioning said material blank over the combination outside diameter and inside diameter turning bit, (n) moving said material blank selectively onto the combination outside diameter and inside diameter turning bit so as to effectively turn an outside and inside of said material blank and thereby complete the definition of a precision wheel at a free end of said material blank secured in said chuck, (o) passing said material blank across the cutoff tool so as to separate the precision wheels from said material blank, and (p) repeating steps i through o until all of the precision wheels are formed.

34. A method as recited in claim 32 further comprising the steps of clampingly securing an expansion base to a support surface of the 3 axis machine tool.

* * * * *